(12) United States Patent
Takehara et al.

(10) Patent No.: US 11,403,944 B2
(45) Date of Patent: Aug. 2, 2022

(54) VEHICLE WIRELESS COMMUNICATION DEVICE

(71) Applicant: Mitsubishi Electric Corporation, Tokyo (JP)

(72) Inventors: Takayoshi Takehara, Tokyo (JP); Akira Hirata, Tokyo (JP); Keisuke Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 172 days.

(21) Appl. No.: 16/641,352

(22) PCT Filed: Sep. 19, 2017

(86) PCT No.: PCT/JP2017/033632
§ 371 (c)(1),
(2) Date: Feb. 24, 2020

(87) PCT Pub. No.: WO2019/058410
PCT Pub. Date: Mar. 28, 2019

(65) Prior Publication Data
US 2020/0242928 A1 Jul. 30, 2020

(51) Int. Cl.
*G08G 1/0967* (2006.01)
*H04W 4/44* (2018.01)
*G08G 1/0968* (2006.01)

(52) U.S. Cl.
CPC . *G08G 1/096783* (2013.01); *G08G 1/096827* (2013.01); *H04W 4/44* (2018.02)

(58) Field of Classification Search
CPC ...... G08G 1/097683; G08G 1/096827; H04W 4/44
See application file for complete search history.

(56) References Cited

U.S. PATENT DOCUMENTS

| 10,627,523 | B2* | 4/2020 | Okada | G08G 1/096741 |
| 2017/0034667 | A1* | 2/2017 | Kumabe | H04W 4/44 |

(Continued)

FOREIGN PATENT DOCUMENTS

| CN | 110401931 A | * | 11/2019 | | H04W 4/44 |
| EP | 3349514 A1 | * | 7/2018 | | H04W 4/44 |

(Continued)

OTHER PUBLICATIONS

IEEE Standard for Wireless Access in Vehicular Environments (WAVE)—Identifier Allocation, IEEE Vehicular Technology Society, Sep. 21, 2012, IEEE Std 1609.12-2012, 20 pages (Year: 2012).*

(Continued)

*Primary Examiner* — Dale W Hilgendorf
(74) *Attorney, Agent, or Firm* — Sughrue Mion, PLLC; Richard C. Turner (57) ABSTRACT

The present application is such that, in order to prevent communication disruption caused by a change in the situation of wireless communication due to the distance between a roadway instrument and a self-vehicle, a vehicle wireless communication device includes a communication section; a control section which controls the reception in the communication section; a position detection section which detects the position of a roadway instrument; and a running direction detection section which detects the running direction of a self-vehicle, wherein the communication section, based on the roadway instrument position detected by the position detection section and on the self-vehicle running direction detected by the running direction detection section, receives information from a roadway instrument next closest to a roadway instrument carrying out communication.

5 Claims, 7 Drawing Sheets

(56) References Cited

U.S. PATENT DOCUMENTS

| | | | |
|---|---|---|---|
| 2018/0077668 A1* | 3/2018 | Chun | H04W 76/23 |
| 2018/0184271 A1* | 6/2018 | Kumabe | H04W 4/40 |
| 2018/0210088 A1* | 7/2018 | Okada | G08G 1/096783 |
| 2018/0249478 A1* | 8/2018 | Kumabe | H04W 4/40 |
| 2018/0263057 A1* | 9/2018 | Yamashiro | H04W 4/44 |
| 2018/0310242 A1* | 10/2018 | Konishi | H04W 4/44 |
| 2019/0028862 A1* | 1/2019 | Futaki | H04W 92/18 |
| 2019/0116462 A1* | 4/2019 | Sagesaka | G07B 15/063 |
| 2019/0327588 A1* | 10/2019 | Gong | H04W 4/44 |
| 2020/0236520 A1* | 7/2020 | Kumabe | H04W 4/44 |

FOREIGN PATENT DOCUMENTS

| | | |
|---|---|---|
| JP | 2006-262176 A | 9/2006 |
| JP | 2009-206866 A | 9/2009 |
| JP | 2017-022561 A | 1/2017 |
| WO | 2015/133179 A1 | 9/2015 |
| WO | 2017/010035 A1 | 1/2017 |
| WO | WO-2017041516 A1 * | 3/2017 ... H04W 4/44 |
| WO | 2017/147797 A1 | 9/2017 |

OTHER PUBLICATIONS

IEEE Guide for Wireless Access in Vehicular Environments (WAVE) Architecture, IEEE Vehicular Technology Society, Feb. 8, 2019, IEEE Std 1609.0-2019, 106 pages (Year: 2019).*

Communication dated Jan. 6, 2021, from the Japanese Patent Office in Application No. 2019-542829.

International Search Report for PCT/JP2017/033632, dated Nov. 28, 2017.

Office Action dated Mar. 23, 2021 in Japanese Application No. 2019-542829.

Communication dated Nov. 29, 2021, issued by the State Intellectual Property Office of the P.R.C. in application No. 201780094774.7.

Communication dated May 5, 2022, issued in Chinese Application No. 201780094774.7.

* cited by examiner

VEHICLE WIRELESS COMMUNICATION DEVICE

CROSS REFERENCE TO RELATED APPLICATIONS

This application is a National Stage of International Application No. PCT/JP2017/033632 filed Sep. 19, 2017.

TECHNICAL FIELD

The present application relates to the field of a vehicle wireless communication device used in a vehicle wireless communication system.

BACKGROUND ART

As a vehicle wireless communication system, WAVE (Wireless Access in Vehicle Environment) is known.

The WAVE is defined so that a vehicle wireless communication device and a roadway instrument carry out communication using two kinds of channels, a control channel (hereinafter referred to as the CCH) and service channels (hereinafter referred to as the SCH).

The SCH are channels used to transmit and receive information. for implementing serves (hereinafter referred to as the service implementation information). As the services, there are a plurality of kinds of services, while as the SCH, too, there are a plurality of channels with mutually differing frequencies, and the individual services are correlated one with each of the plurality of SCH. The CCH is a channel used to transmit various items of information which are required to be notified of in order for the roadway instrument to carry out communication using the SCH with the vehicle wireless communication device (hereinafter referred to as the service notification information).

It is necessary, in order to start the communication using the SCM, to set channels to be used for reception by the vehicle wireless communication device (hereinafter referred to as the reception channels), one to each. of the SCH. For this reason, the service notification information contains information which specifies the SCM to be set to the respective reception channels (hereinafter referred to as the channel information).

In order to be able to set the two kinds of channels, the CCH and the SCM, in PTL 1, an arrangement is such that it is possible to have a plurality of channels by dividing into a communication section with the CCH as the reception channel and a communication section with the SCM as the reception channels.

CITATION LIST

Patent Literature

PTL 1: JP-2017-22561

SUMMARY OF INVENTION

Technical Problem

In the heretofore known vehicle wireless communication device, it is possible, by receiving the service notification information, to set the reception channels to the SCH specified by the channel information. contained in the service notification information. However, for example, when a running self-vehicle communicates with a predetermined roadway instrument using the set SCH, the self-vehicle and the predetermined roadway instrument once come close in distance to each other, but eventually draw apart in distance from one another, as the running time of the self-vehicle passes. A problem arises in that the self-vehicle and the roadway instrument draw apart in distance from one another with the running time of the self-vehicle, thereby disrupting the communication between the self-vehicle and the roadway instrument. Then, in the event that the communication is disrupted while the services are being carried out, it results in limited access to the services.

The present application has been made to solve the above problem, and an object of the present application is to provide a vehicle wireless communication device which can prevent communication between a self-vehicle and a roadway instrument from falling into disruption.

Solution to Problem

The vehicle wireless communication device of the present application includes a communication section; a control section which controls the reception in the communication section; a position detection section which detects the position of a roadway instrument; and a running direction detection section which detects the running direction of a self-vehicle, wherein the vehicle wireless communication device is configured to control the communication section, based on the roadway instrument position detected by the position detection section and on the self-vehicle running direction detected by the running direction detection section, to receive information from a roadway instrument next closest to a roadway instrument carrying out communication.

Advantageous Effects of Invention

According to the present application, it is possible to prevent an occurrence of disruption of communication between a running self-vehicle and a roadway instrument.

DESCRIPTION OF EMBODIMENTS

First Embodiment

In a vehicle wireless communication device complying with WAVE standards, one CCH and a plurality of SCH are set as communication channels. The CCH and the plurality of SCH are set one to each of predetermined frequency channels differing from one another.

Figure 1:
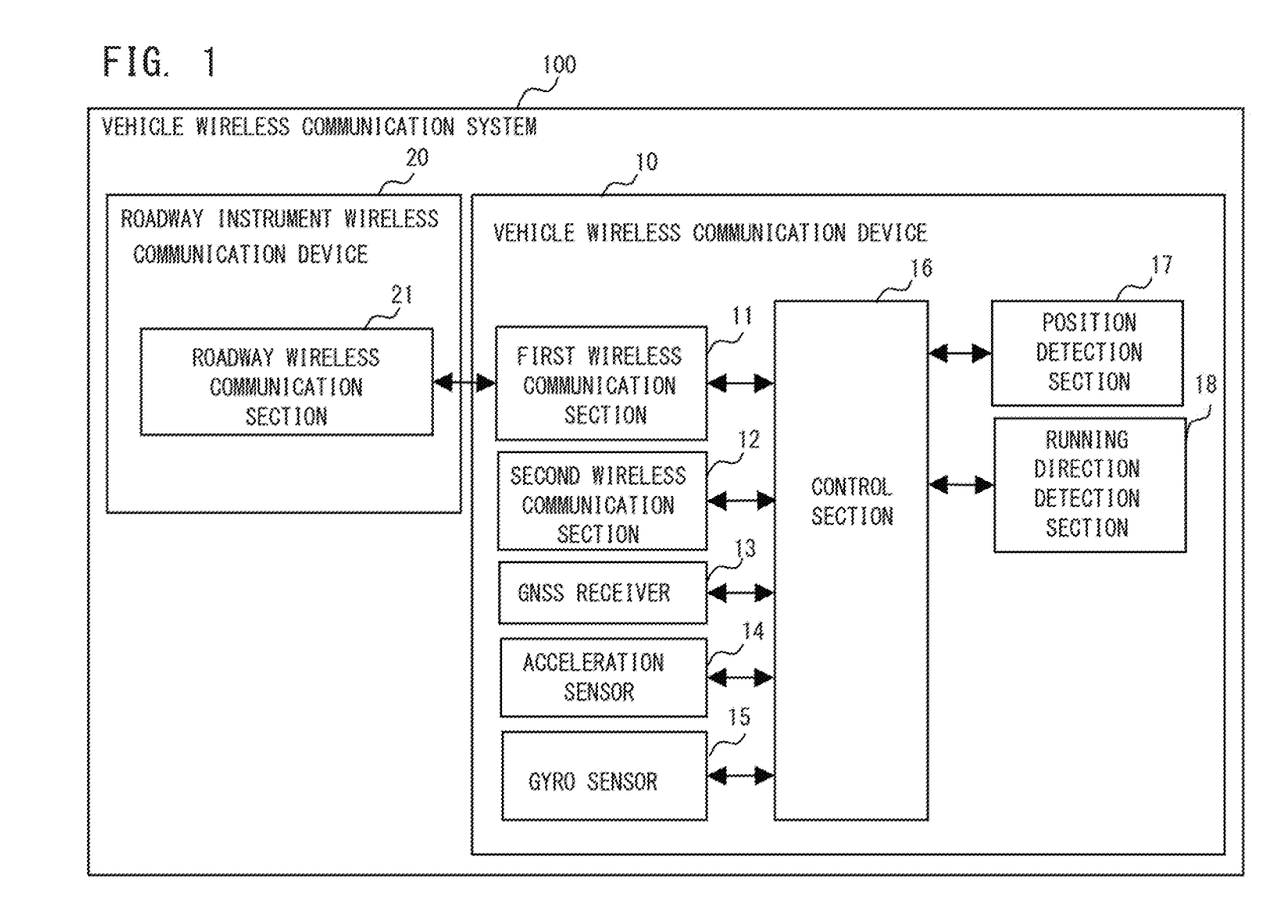
FIG. 1 is a block diagram showing the configuration of a vehicle wireless communication system according to a first embodiment of the present application.

Hereinafter, a description will be given, using the drawings, of the first embodiment of the present application. FIG. 1 is a block diagram showing the configuration of a vehicle wireless communication system 100. The vehicle wireless communication system 100, being configured of a vehicle wireless communication device 10 and a roadway instrument wireless communication device 20, is configured to carry out communication between a mobile vehicle (hereinafter referred to as the self-vehicle), such as an automobile, which is mounted with the vehicle wireless communication device 10, and an instrument (hereinafter referred to as the roadway instrument) which is mounted with a predetermined roadway instrument wireless communication device 20 and installed at a traffic intersection or the like.

As shown in FIG. 1, the vehicle wireless communication device 10 includes a first wireless communication section 11, a second wireless communication section 12, a GNSS (Global Navigation Satellite System) receiver 13, an acceleration sensor 14, a gyro sensor 15, a control section 16, a position detection section 17, and a running direction detection section 18. The first and second wireless communication sections 11 and 12 carry out communication, such as wireless communication, with the roadway instrument which exists in a range of a predetermined distance from the first and second wireless communication sections 11 and 12. Hereinafter, identical signs indicate respective identical or equivalent portions.

Also, as shown in the drawing, the roadway instrument wireless communication device 20 includes a roadway wireless communication section 21. The roadway instrument wireless communication device 20 is arranged so as to carry out notification by transmitting a WSA (Wave Service Announcement) using the CCH. The WSA, being equivalent to service notification information, contains, for example, information on the SCH which are frequency channels on which to transmit service implementation information which is information for implementing services, that is, channel information, and latitude and longitude as information on the position of the roadway instrument. Also, the roadway instrument wireless communication device 20 transmits the service implementation information using the SCH notified of through the WSA.

The first wireless communication section 11 of the vehicle wireless communication device 10 is configured so as to be able to set one frequency channel to a communication channel by switching between the plurality of frequency channels. The communication channel is a channel on which to carry out reception and transmission.

The second wireless communication section 12 can set two communication channels, wherein one is a fixed CCH and the other is a communication channel to which one frequency channel can be set by switching between the plurality of frequency channels.

The GNSS receiver 13, by receiving radio waves from satellites used in GNSS, acquires data indicating the current position of the GNSS receiver 13. The current position information acquired by the GNSS receiver 13 is represented by, for example, latitude and longitude. The current position information acquired by the GNSS receiver is provided sequentially (for example, every 100 milliseconds) to the control section 16.

The acceleration sensor 14 detects the acceleration which acts on the front-back direction of the self-vehicle. The vehicle wireless communication device 10 is mounted in a predetermined position on the self-vehicle so that the direction of the acceleration detected by the acceleration sensor 14 coincides with the front-back direction of the self-vehicle. The acceleration sensor 14 may be a triaxial accelerometer which detects the accelerations which act on three axial directions perpendicular to each other, the front-back direction, left-right direction, and up-down direction of the self-vehicle.

The gyro sensor 15 detects the rotational angular velocity around the vertical axis of the self-vehicle with the vehicle wireless communication device being mounted in the predetermined position. The acceleration sensor 14 and the gyro sensor 15 are used to determine an assumed position of the vehicle wireless communication device 10.

Figure 2:
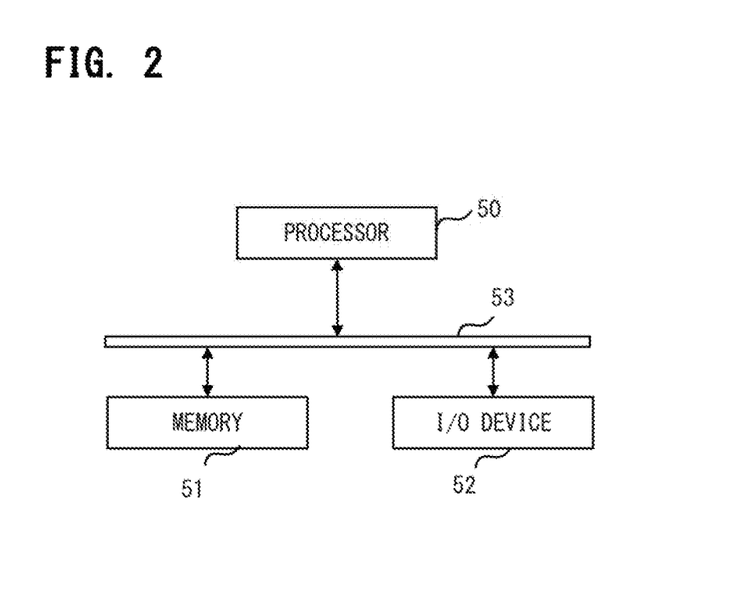
FIG. 2 is a block diagram showing the configuration of a control section of the first embodiment of the present application.

The control section 16, being configured as an ordinary computer, is configured of a well-known processor 50, a memory 51, which is configured of a non-volatile memory, such as a ROM or a flash memory, and a volatile memory, such as a RAM, an I/O device 52, and a bus line 53 which connects these component parts, as shown in FIG. 2.

The control section 16 controls the operations of the first and second wireless communication sections 11 and 12. Specifically, the first wireless communication section 11 is set to the SCH, and the communication channels of the second wireless communication section 12 are set to the CCH and SCH.

The position detection section 17 detects the roadway instrument position information contained in the WSA.

The running direction detection section 18 detects the running direction of the self-vehicle from the position information and acceleration of the self-vehicle, and from the rotational angular velocity around the vertical axis of the self-vehicle, which are respectively from the GNSS receiver 13, acceleration sensor 14, and gyro sensor 15.

A description will be given, following FIG. 3, of the operation of the vehicle wireless communication device 10 of the vehicle wireless communication system 100 shown in FIG. 1.

First, a plurality of WSA containing information on channels which can be set to the SCH of the first wireless communication section 11 are received on the CCH of the second wireless communication section 12 (Step S1).

Next, a plurality of WSAs containing information on channels which can be set to the SCHs of the second wireless communication section 12 are similarly received on the CCH of the second wireless communication section 12 (Step S2). The information of the WSAs contains latitude and longitude as the roadway instrument position information.

Next, the running direction detection section 18 acquires items of information on the position, acceleration, and travel orientation of the vehicle from the GNSS receiver 13, acceleration sensor 14, and gyro sensor 15, and detects the running direction of the self-vehicle S3). That is, behavioral information is acquired.

Next, the position detection section 17 acquires the roadway instrument position information from the WSA.

Next, the control section 16 compares the running direction of the self-vehicle and the roadway instrument position information from the WSA, and selects a roadway instrument closest in the travel direction for each of the first and second wireless communication sections 11 and 12 (Step S4).

Next, the SCH of the first and second wireless communication sections 11 and 12 are set to the SCH of the selected roadway instrument (Step S5).

As above, according to the first embodiment, by setting to SCH, from among a plurality of settable SCH, on which to communicate with the roadway instrument closest in the travel direction of the self-vehicle, it is possible to prevent communication disruption between the self-vehicle and a predetermined roadway instrument.

The respective functions of the first and second wireless communication sections 11 and 12 may be interchanged with one another, and the first wireless communication section 11 may be set to the CCH and SCH, while the second wireless communication section 12 may be set to the SCH.

Second Embodiment

Figure 4:
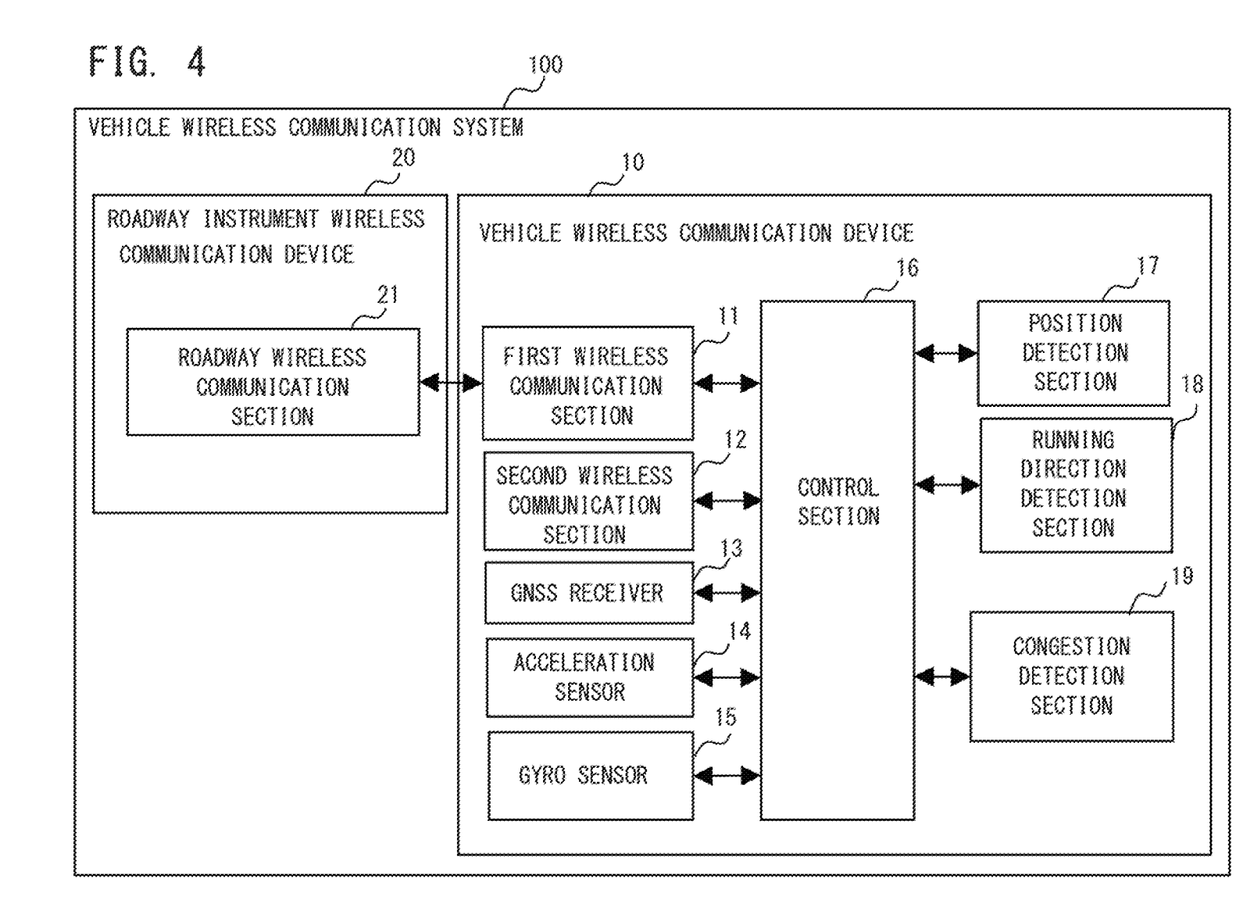
FIG. 4 is a block diagram showing the configuration of a vehicle wireless communication system according to a second embodiment of the present application.
Figure 5:
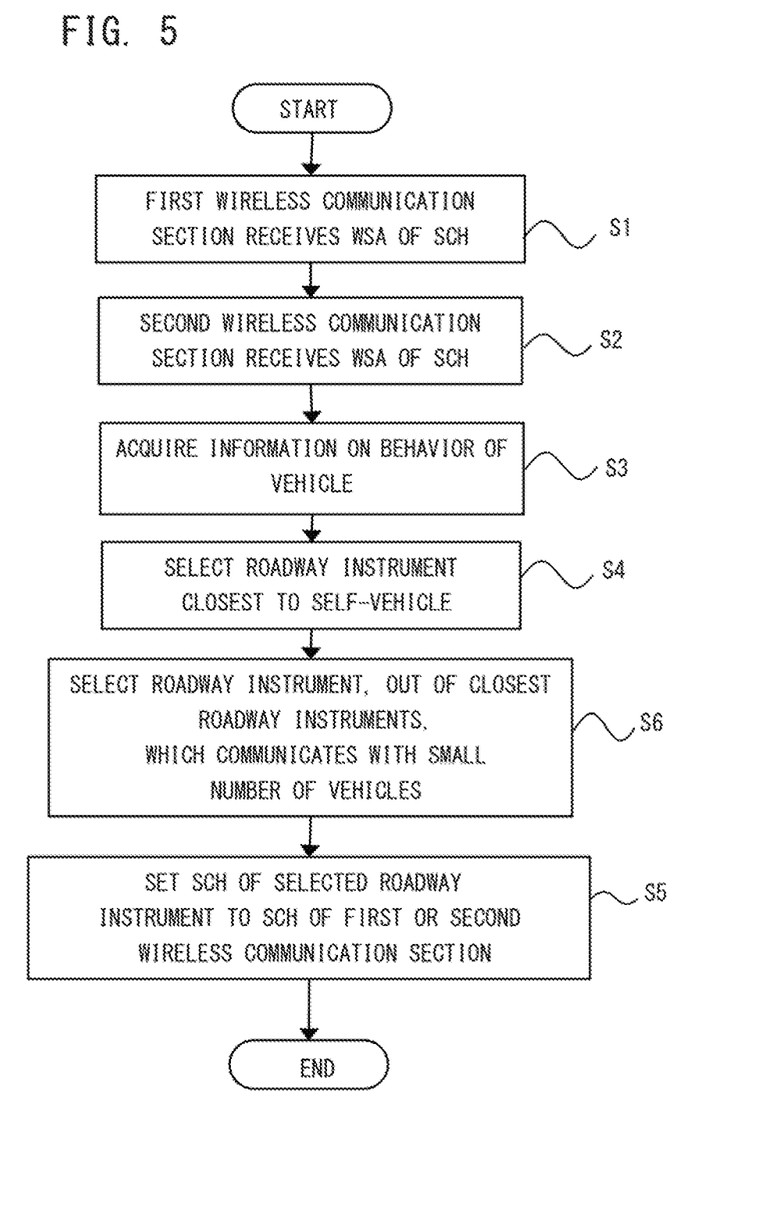
FIG. 5 is a flowchart showing the operation of a vehicle wireless communication device according to the second embodiment of the present application.

A description will be given, using the drawings, of the second embodiment of the present application. FIG. 4 is a block diagram showing the configuration of a vehicle wireless communication system. FIG. 5 is a process flowchart of a vehicle wireless communication device.

A vehicle wireless communication device 10 complies with WAVE standards, and communication channels are the same as in the first embodiment.

First, a description will be given, using FIG. 4, of the configuration of a vehicle wireless communication system 100 which is the present embodiment. FIG. 4 is a configuration schematic diagram for describing the outline of the configuration of the vehicle wireless communication system 100. The vehicle wireless communication system 100 is a system which, being configured including the vehicle wireless communication device 10 and a roadway instrument wireless communication device 20, is configured so as not to disrupt communication between a self-vehicle mounted with the vehicle wireless communication device 10 and an instrument (hereinafter referred to as the roadway instrument) which is mounted with a predetermined roadway instrument wireless communication device 20 and installed at a traffic intersection or the like.

The roadway instrument wireless communication device 20 makes notification of WSA using a CCH. The WSA, being equivalent to service notification information, contains, for example, information on SCM which are frequency channels on which to transmit service implementation information which is information for implementing services, that is, channel information, latitude and longitude as information on the position of the roadway instrument, and the number of vehicles with which the roadway instrument is in communication. Also, the roadway instrument wireless communication device 20 transmits the service implementation information using the SCH notified of through the WSA.

A congestion detection section 19 manages the information on the number of vehicles with which the roadway instrument communicates. The other units configuring FIG. 4 are identical or equivalent to those in FIG. 1 and so are omitted from description.

A description will be given, in accordance with FIG. 5, of the operation of the vehicle wireless communication device 10 of the vehicle wireless communication system 100 of the configuration shown in FIG. 4.

First, a plurality of WSA containing information on channels which can be set to the SCH of the first wireless communication section 12 are received on the CCH of the second wireless communication section 12 (Step S1).

Next, a plurality of WSA containing information on channels which can be set to the SCH of the second wireless communication section 12 are similarly received on the CON of the second wireless communication section 12 (Step S2). The information of the WSA contains latitude and longitude as the roadway instrument position information and the number of vehicles which communicate with the roadway instrument.

Next, the running direction detection section 18 acquires items of information on the position, acceleration, and travel orientation of the vehicle from the GLASS receiver 13, acceleration sensor 14, and gyro sensor 15, and detects the running direction of the self-vehicle (Step S3).

Next, the position detection section 17 acquires the roadway instrument position information from the WSA.

Next, the control section 16 compares these items of information and the roadway instrument position information from the WSA, and selects roadway instruments closest in the travel direction for each of the first and second wireless communication sections 11 and 12 (Step S4).

Next, the congestion detection section 19 selects, from among the closest roadway instruments, a roadway instrument in communication with a small number of vehicles (Step S6).

Next, the SCH of the first and second wireless communication sections 11 and 12 are set to the SCH of the selected roadway instrument (Step S5).

As above, according to the second embodiment, a roadway instrument which communicates with a small number of vehicles is selected from among roadway instruments closest in the travel direction of the self-vehicle, and is set to SCH out of a plurality of settable SCH, and thereby it is possible to prevent communication disruption between the self-vehicle and a predetermined roadway instrument.

The respective functions of the first and second wireless communication sections 11 and 12 may be interchanged with one another, and the first wireless communication section 11 may be set to the CCH and SCH, while the second wireless communication section 12 may be set to the SCH.

The present application is suitable for a vehicle wireless communication device wherein it is possible to avoid communication disruption by setting communication between the self-vehicle and a predetermined roadway instrument so as to avoid roadway instruments in traffic congestion.

Third Embodiment

Figure 6:
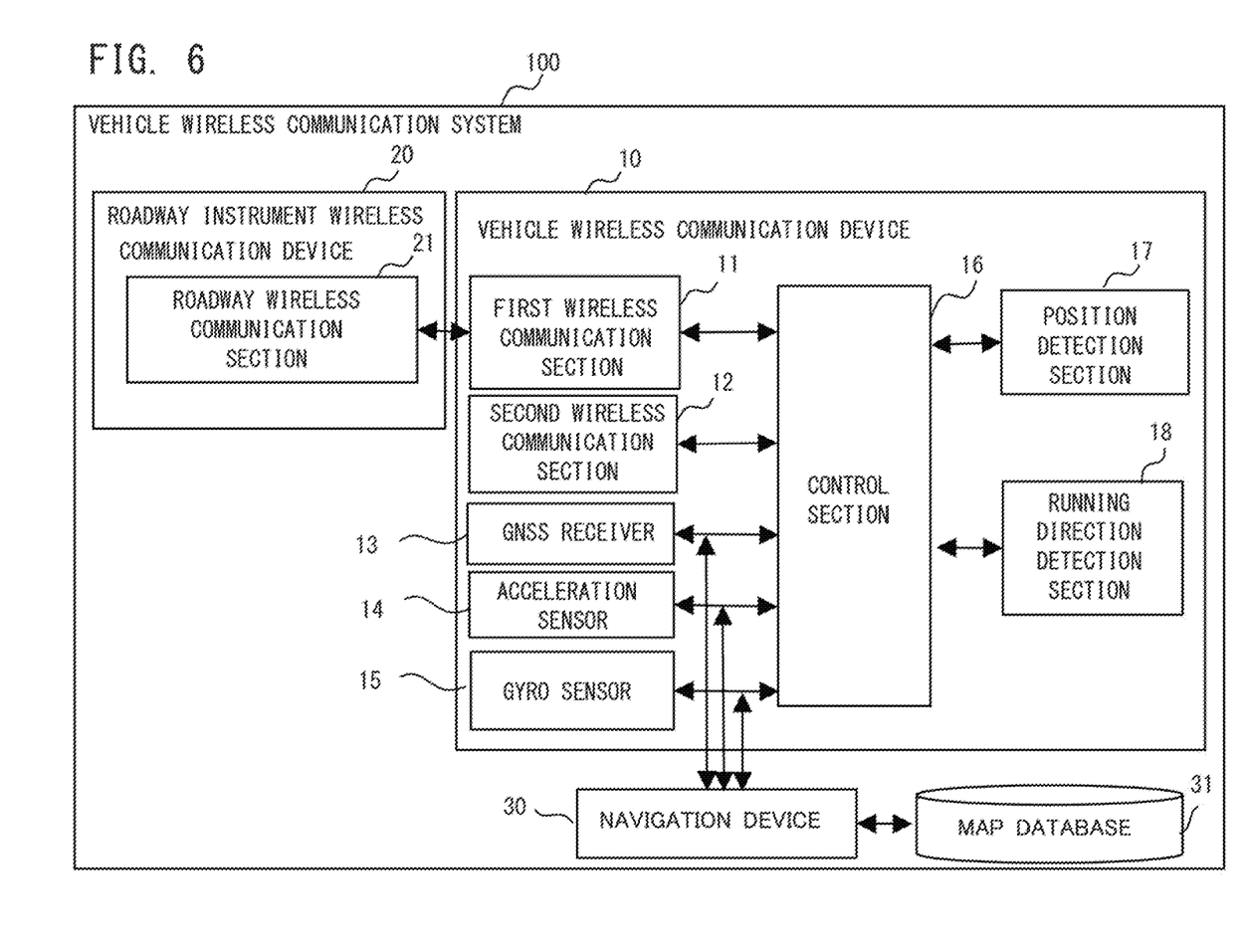
FIG. 6 is a block diagram showing the configuration of a vehicle wireless communication system according to a third embodiment of the present application.

A description will be given, using FIG. 6, of the third embodiment of the present application.

With the configuration of the third embodiment, in addition to that of the first embodiment, by using a navigation device 30, which, by a driver setting his/her self-vehicle's destination, provides the driver with a map of the area, a route to run on, and road related information, and a man database 31 which stores traffic information and road related information which the navigation device 30 refers to, the control section 16 acquires from the navigation device 30 the positions of roadway instrument wireless communication devices 20 contained in the database, and thereby it is possible to acquire the mutual positional relationship between the vehicle wireless communication device 10 and the roadway instrument wireless communication devices 20 even in their non-communicable state, and possible to comprehend in advance the existence of a roadway instrument passed and a roadway instrument to be accessed next, and thus to use the comprehended roadway instrument existence information as factors to determine whether to discard or select the SCH.

Figure 3:
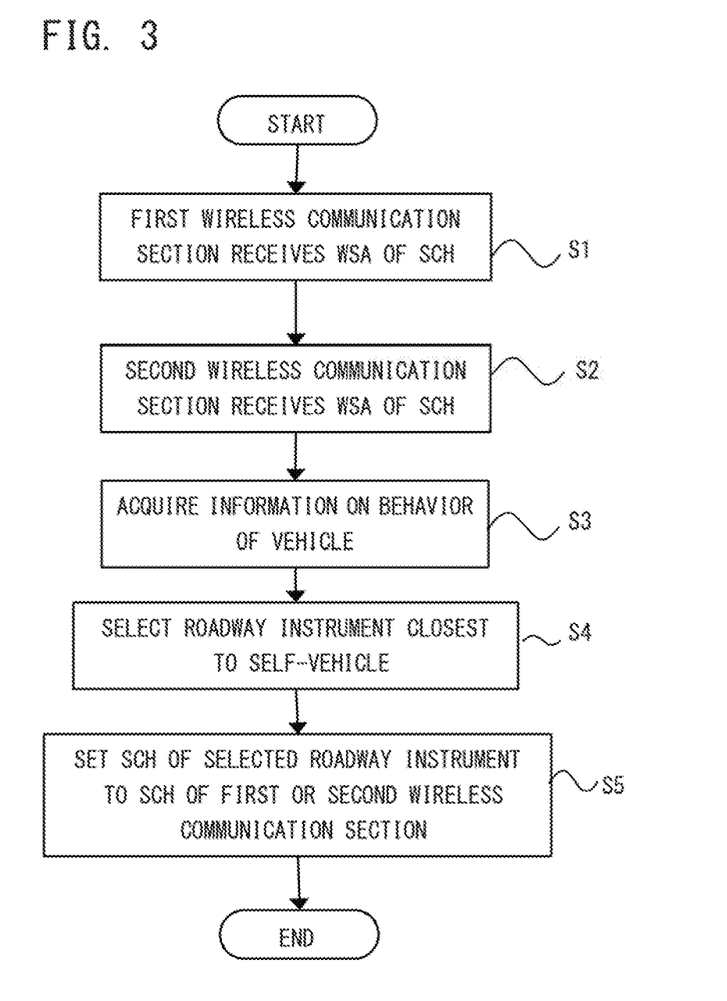
FIG. 3 is a flowchart showing the operation of a vehicle wireless communication device according to the first embodiment of the present application.

The processing procedure of the vehicle wireless communication device 10 according to the third embodiment is the same as in the first and second embodiments and can be described along the details in each of FIGS. 3 and 5. That is, when selecting a roadway instrument closest to the self-vehicle in Step S4 shown in each of FIGS. 3 and 5, the processing procedure can be applied to the process of selecting the closest roadway instrument by using the information, acquired from the navigation device 30, on the positions of roadway instruments which exist in the travel direction of the self-vehicle.

Also, it becomes possible, from routing information which the navigation device 30 has, to comprehend at an early point that the self-vehicle moves in the direction in which the roadway instrument passed goes farther away therefrom, and it is possible to carry out the discard of the SCH set to a passing roadway instrument more efficiently than when determining the discard thereof based on the positional relationship using GNSS.

Fourth Embodiment

Figure 7:
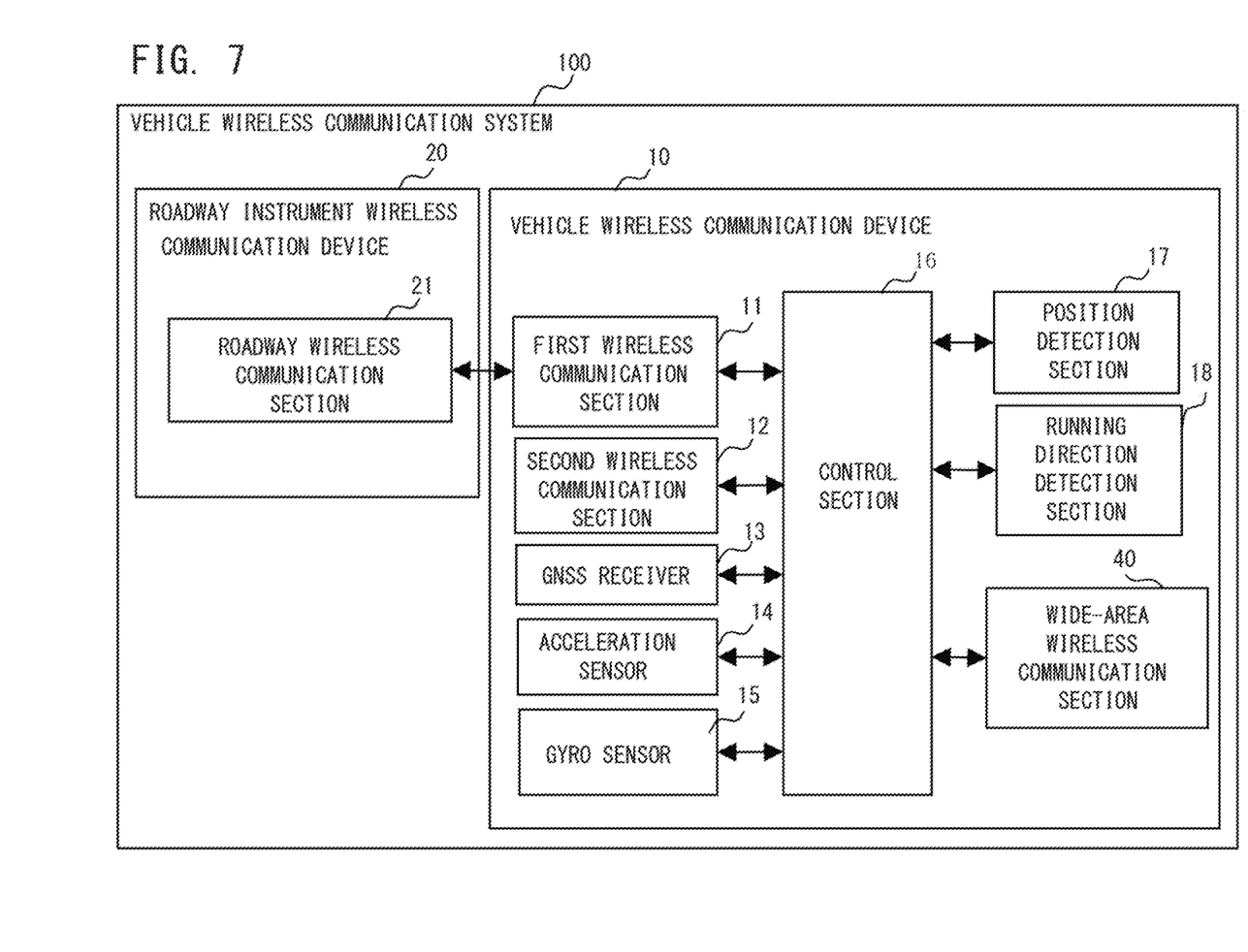
FIG. 7 is a block diagram showing the configuration of a vehicle wireless communication system according to a fourth embodiment of the present application.

FIG. 7 is a configuration diagram of a vehicle wireless communication system 100 of the fourth embodiment.

The configuration of the fourth embodiment, in addition to that of the first embodiment, includes a wide-area wireless communication section 40. The wide-area wireless communication section 40 receives information equivalent to the WSA of the SCH by utilizing a cell phone network or the like.

The processing procedure in the fourth embodiment is the same as in FIG. 3 showing the processing procedure of the first embodiment. In Steps S1 and S2 shown in FIG. 3, the wide-area wireless communication section 40 receives a plurality of WSA containing information on channels which can be set to the first and second wireless communication sections 11 and 12. The WSA contain latitude and longitude as the roadway instrument position information. Step S3 and the subsequent steps are the same as in the first embodiment.

According to the heretofore described configuration, as it is possible, by communication by the wide-area wireless communication section 40, to receive the channel information even at a timing point other than when passing the vicinity of a roadway instrument, there is an increasing chance to be able to comprehend the channel of the roadway instrument which is coming near or is going away, so that it is possible to have a plenty of time to deal with the self-vehicle and the roadway instrument, and thereby it is possible to have a large number of settings of countermeasures to be taken when communication disruption occurs.

Although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

The invention claimed is:

1. A vehicle wireless communication device, comprising:
a communication interface configured to communicate with an external device via a plurality of frequency channels; and
at least one processor configured to:
    determine positions of a plurality of roadway instruments based on a wave service announcement received from the plurality of roadway instruments via a control channel (CCH);
    determine a travel direction of a self-vehicle based on sensing data collected by one or more sensors mounted in the self-vehicle; and
    when two or more roadway instruments are closest to the self-vehicle among the plurality of roadway instruments, select one of the two or more roadway instruments that communicates with a smallest number of vehicles, and causes the communication interface to receive information from the selected roadway instrument, by setting a service channel (SCH) of the communication interface of the self-vehicle to be equal to an SCH of the selected roadway instrument, among a plurality of SCHs.

2. A vehicle wireless communication device which receives information from a roadway instrument on a plurality of service channels and a control channel which are set to mutually differing frequency channels, the vehicle wireless communication device comprising:
a communication interface comprising a first wireless communication interface and a second wireless communication interface to communicate with an external device, wherein the first wireless communication interface is configured to set one of the plurality of service channels as a communication channel of the first wireless communication interface by switching between the plurality of service channels, and the second wireless communication interface is configured to set two frequency channels corresponding to the control channel and one of the plurality of service channels, as communication channels of the second wireless communication interface; and
at least one processor configured to:
    determine positions of a plurality of roadway instruments based on a wave service announcement received from the plurality of roadway instructions via the control channel of the second wireless communication interface;
    determine a travel direction of a self-vehicle based on sensing data collected by one or more sensors mounted in the self-vehicle;
    when two or more roadway instruments are closest to the self-vehicle among the plurality of roadway instruments, select one of the two or more roadway instruments that communicates with a smallest number of vehicles, and causes the first wireless communication interface to receive information from the selected roadway instrument, by setting the service channels of the first wireless communication interface and the second wireless communication interface to be equal to a service channel of the selected roadway instrument.

3. The vehicle wireless communication device according to claim 2, wherein
before the positions of the plurality of roadway instruments are determined based on the wave service announcement, a determination of whether the plurality of roadway instruments is in the travel direction of the self-vehicle is performed by using a navigation device mounted on the self-vehicle.

4. The vehicle wireless communication device according to claim 2, wherein the at least one processor is further configured to:
disconnect a communication between the self-vehicle and the selected roadway instrument in response to determining that the self-vehicle is moving away from the selected roadway instrument based on information detected by a navigation device mounted on the self-vehicle.

5. The vehicle wireless communication device according to claim 2,
wherein the communication interface is configured to receive service notification information via wide-area wireless communication.

* * * * *